United States Patent [19]

Roth et al.

[11] 4,115,368

[45] Sep. 19, 1978

[54] CROSSLINKABLE POLYMERS OF COMPOUNDS CONTAINING 5-MALEIMIDYL-ISOPHTHALIC ACID DERIVATIVES

[75] Inventors: Martin Roth, Basel; Roland Darms; Josef Pfeifer, both of Therwil, all of Switzerland

[73] Assignee: Ciba-Geigy Corporation, Ardsley, N.Y.

[21] Appl. No.: 696,349

[22] Filed: Jun. 15, 1976

[30] Foreign Application Priority Data

Jun. 18, 1975 [CH] Switzerland .................. 7954/75

[51] Int. Cl.² .......................................... C08G 73/12
[52] U.S. Cl. .................................... 528/229; 526/262; 528/170; 528/289; 528/322; 528/326; 528/321; 526/15; 526/23; 526/288; 428/474
[58] Field of Search ........ 260/47 UA, 47 CP, 78 UA, 260/78 TF, 65, 46.5 E

[56] References Cited

U.S. PATENT DOCUMENTS

| | | | |
|---|---|---|---|
| 3,625,912 | 12/1971 | Vincent et al. | 260/30.2 |
| 3,639,357 | 2/1972 | Cohen | 260/78 UA |
| 3,666,720 | 5/1972 | Nieid et al. | 260/47 UA |
| 3,671,490 | 6/1972 | Bargain | 260/47 CP |
| 3,689,464 | 9/1972 | Holub et al. | 260/78 UA |

*Primary Examiner*—Lester L. Lee
*Attorney, Agent, or Firm*—Luther A. R. Hall

[57] ABSTRACT

New crosslinkable polymers, in particular polymerization products of 5-maleimidyl-isophthalic acid derivatives and 5-(nadic acid)-isophthalic acid derivatives and vinyl monomers and polycondensation products of the said isophthalic acid derivatives and diamines, diols or aminoalcohols and optionally a di-, tri- or tetra-carboxylic acid derivative are described. These polymers are distinguished by good processability and good solubility in customary organic solvents and are suitable for the manufacture of various industrial products, such as thin films, thick films and compression mouldings.

12 Claims, No Drawings

CROSSLINKABLE POLYMERS OF COMPOUNDS CONTAINING 5-MALEIMIDYL-ISOPHTHALIC ACID DERIVATIVES

The present invention relates to new crosslinkable polymers, a process for their manufacture and their use for the manufacture of crosslinked polymers.

The new crosslinkable polymers have an average molecular weight of at least 1,000. They consist either (A) of 0.5 to 100 mol % of recurring structural elements of the formula I

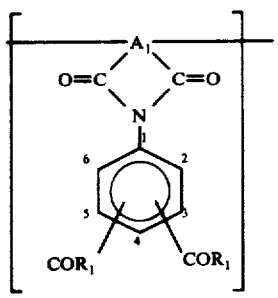
(I)

and of 0 to 99.5 mol % of recurring structural elements of the formula II

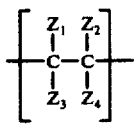
(II)

or (B) of 0.5 to 100 mol % of recurring structural elements of the formula III

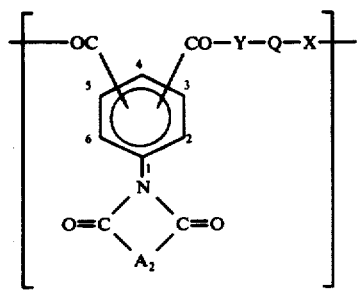
(III)

and 0 to 99.5 mol % of recurring structural elements of the formula IV

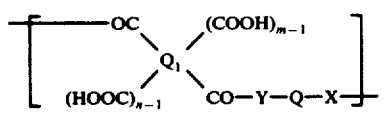
(IV)

or of the corresponding imidised derivatives, and contain at least three structural elements of the formula I or III. The —$COR_1$ groups in formula I and the —CO— groups in formula III are bonded to the benzene ring in the 2,3-, 3,4- or, preferably, 3,5-position.

In the above formulae I to IV: $m$ and $n$ independently of one another denote the number 1 or 2, $A_1$ denotes a radical of the formula

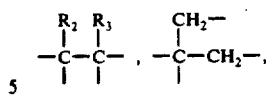

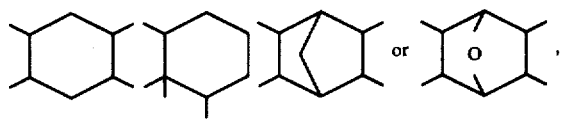

$A_2$ denotes a radical of the formula

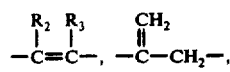

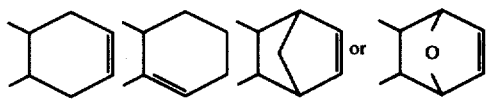

$R_1$ denotes a hydroxyl group, an unsubstituted or substituted phenoxy group, an alkoxy group with 1–18, and preferably 1–12, carbon atoms or a —$O^-M^+$ group, $M^+$ denotes an alkali metal cation, a trialkylammonium cation with 3–24, and especially 3–12, carbon atoms or a quaternary ammonium cation, $R_2$ and $R_3$ independently of one another denote hydrogen, chlorine or bromine, X and Y independently of one another denote

or —O— and $R_4$ = hydrogen, alkyl with 1–4 carbon atoms or phenyl, Q denotes an aliphatic radical with at least 2 carbon atoms or a cycloaliphatic, araliphatic, carbocyclic-aromatic or heterocyclic-aromatic radical, or —Y—Q—X— denotes the grouping

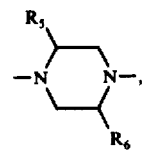

$R_5$ and $R_6$ independently of one another denote hydrogen, methyl or phenyl and $Q_1$ denotes an aliphatic radical or denotes a cycloaliphatic, carbocyclic-aromatic or heterocyclic-aromatic radical in which the carbonyl and carboxyl groups are bonded to different carbon atoms and the carboxyl groups are each in the ortho-position relative to a carbonyl group, $Z_1$ and $Z_3$ each denote hydrogen, $Z_2$ denotes hydrogen, chlorine or methyl and $Z_4$ denotes hydrogen, methyl, ethyl, chlorine, —CN, —COOH, —$CONH_2$, phenyl, methylphenyl, methoxyphenyl, cyclohexyl, pyridyl, imidazolyl, pyrrolidonyl, —COO-alkyl with 1–12 carbon atoms in the alkyl part, —COO-phenyl,

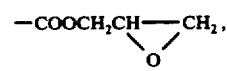

—COO-alkyl-OH with 1–3 carbon atoms in the alkyl part,

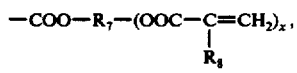

wherein $R_7$ denotes a linear or branched saturated aliphatic radical with at most 10 carbon atoms, $R_8$ denotes hydrogen or methyl and $x$ denotes an integer from 1 to 3; —OCO-alkyl with 1–4 carbon atoms in the alkyl part, —OCO-phenyl, —CO-alkyl with 1–3 carbon atoms in the alkyl part, alkoxy with 1–6 carbon atoms, phenoxy, —CH=CH$_2$ or

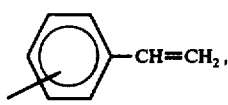

or $Z_1$ and $Z_2$ each denote hydrogen and $Z_3$ and $Z_4$ conjointly denote a

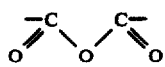

grouping.

Crosslinkable polymers according to the definition can be manufactured when (a) 0.5 to 100 mol % of a compound of the formula Va

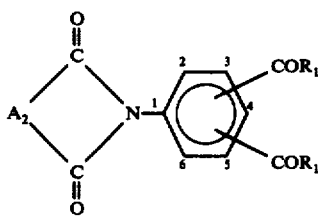 (Va)

are polymerised with 0 to 99.5 mol % of a compound of the formula VI

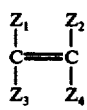 (VI)

or (b) 0.5 to 100 mol % of a compound of the formula Vb

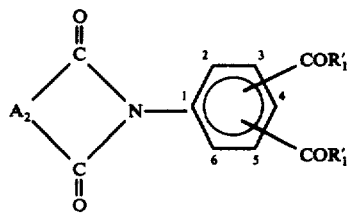 (Vb)

and 0 to 99.5 mol % of a compound of the formula VII

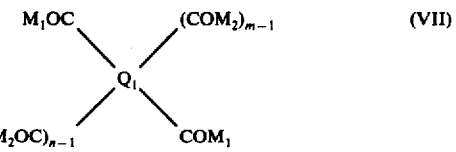 (VII)

are subjected to a condensation reaction with substantially stoichiometric amounts of a compound of the formula VIII

 (VIII)

and the resulting polymers, in which $m$ and/or $n = 2$, are optionally subsequently cyclised to give the imide.

In the above formulae, what has been stated above applies in respect of $m$, $n$, $A_2$, $R_1$, X, Y, Q, $Q_1$, $Z_1$, $Z_2$, $Z_3$ and $Z_4$; $R_1'$ represents a chlorine atom, a hydroxyl group, an unsubstituted or substituted phenoxy group or an alkoxy group with 1–18 carbon atoms and $M_1$ denotes a chlorine atom, a hydroxyl group, an unsubstituted or substituted phenoxy group or an alkoxy group with 1–18 carbon atoms or, when $m$ and/or $n = 2$, $M_1$ conjointly with $M_2$ forms the —O— grouping, and the groups —COM$_1$ and —COM$_2$ are bonded to different carbon atoms and the —COM$_1$ groups are each in the ortho-position relative to a —COM$_2$ group.

Polymers according to the invention which consist of structural elements of the formula I and II and have an average molecular weight of about 10,000 to 700,000, but especially polymers consisting of structural elements of the formulae III and IV and having an average molecular weight of about 1,500 to 70,000, are preferred.

According to a further preference, polymers according to the invention consist of 1 to 50 mol % of structural elements of the formula I and 50 to 99 mol % of structural elements of the formula II or of 3 to 50 mol % of structural elements of the formula III and 50 to 97 mol % of structural elements of the formula IV.

$A_1$ and $A_2$ preferably represent a group of the formula

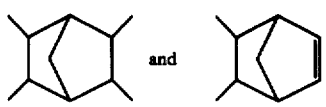

respectively or a

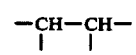

group and a —CH=CH— group respectively.

If $R_1$ or $R_1'$ or $M_1$ represent substituted phenoxy groups, the latter are, in particular, phenoxy groups which are substituted by nitro groups or alkyl or alkoxy groups with 1 or 2 carbon atoms or by halogen atoms, above all chlorine or fluorine, such as the 2-, 3- or 4-nitrophenoxy group, the 2,4- or 3,5-dinitrophenoxy group, the 3,5-dichlorophenoxy group, the pentachlorophenoxy group or the 2-methyl- or 2-methoxy-phenoxy group.

Alkoxy groups $R_1$, $R_1'$ and $M_1$ can be straight-chain or branched. Examples which may be mentioned are: the methoxy, ethoxy, n-propoxy, isopropoxy, n-butoxy, tert.-butoxy, hexyloxy, octoxy, decyloxy, dodecyloxy, tetradecyloxy and octadecyloxy group. Unsubstituted phenoxy groups or alkoxy groups with 1–12, and especially 1–4, carbon atoms are preferred.

If $R_1$ denotes a —O $M^+$ group, $M^+$ represents, for example, the lithium, sodium, potassium, trimethylammonium, triethylammonium, methyl-diethylammonium, tri-n-octylammonium, benzyltrimethylammonium or tetramethylammonium cation. $M^+$ preferably represents the sodium cation.

X and Y preferably have the same meaning.

If $R_4$ represents an alkyl radical, the latter has, in particular, 1 or 2 carbon atoms. However, $R_4$ preferably denotes hydrogen.

The polymers according to the invention, which consist of structural elements of the formula I and II or III and IV are, respectively, so-called statistical copolymers and polycondensation products which have a statistical distribution of the structural elements of the formulae III and IV.

In the formulae III and IV, the individual Q and $Q_1$ can have different meanings.

Aliphatic, araliphatic, cycloaliphatic, carbocyclic-aromatic or heterocyclic-aromatic radicals represented by Q can be unsubstituted or substituted by, for example, halogen atoms, such as fluorine, chlorine or bromine, or by alkyl or alkoxy groups each with 1 to 4 carbon atoms.

Possible aliphatic radicals Q are, above all, straight-chain or branched alkylene groups with 2 to 12 carbon atoms, it also being possible for the alkylene chain to be interrupted by hetero-atoms, such as O, S or N atoms.

In the meaning of a cycloaliphatic radical, Q represents, for example, the 1,3- or 1,4-cyclohexylene group, the 1,4-bis-(methylene)-cyclohexane group or the dicyclohexylmethane group, whilst possible araliphatic radicals are, above all, 1,3-, 1,4- or 2,4-bis-alkylenebenzene groups, 4,4'-bis-alkylene-diphenyl groups and 4,4'-bis-alkylene-diphenyl ether groups.

If Q represents a carbocyclic-aromatic radical, preferred radicals are monocyclic, condensed polycyclic or non-condensed bicyclic aromatic radicals and in the case of the latter the aromatic nuclei are bonded to one another by means of a bridge member.

Examples of suitable bridge members which may be mentioned are: —O—, —CH$_2$CH$_2$—, —CH$_2$—,

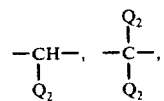

—S—S—, —SO—, —SO$_2$—, —SO$_2$NH—, —CO—,

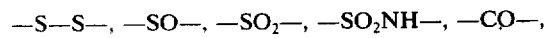

—CONH—, —NH—CO—NH—,

wherein $Q_2$ denotes an alkyl group with 1–6, and preferably 1–4, carbon atoms or denotes a phenyl group.

Non-condensed, bicyclic aromatic radicals Q can also be bonded to one another by means of two bridge members, such as two —SO$_2$— groups.

If Q denotes a heterocyclic-aromatic radical, these radicals are, in particular, heterocyclic-aromatic 5-membered or 6-membered rings which contain O, N and/or S.

If $Q_1$ represents an aliphatic radical, these radicals are preferably unsubstituted, straight-chain or branched saturated alkylene radicals with 1 to 10 and especially 3 to 10 carbon atoms.

Cycloaliphatic radicals represented by $Q_1$ are, above all, 5-membered or 6-membered cycloalkylene groups.

If $Q_1$ denotes a carbocyclic-aromatic radical, this preferably contains at least one 6-membered ring; in particular, such radicals are monocyclic or condensed polycyclic radicals or polycyclic radicals which have several cyclic, condensed or non-condensed systems, which can be bonded to one another direct or via bridge members. Possible bridge members are the groups mentioned in the foregoing text when Q was discussed.

If $Q_1$ represents a heterocyclic-aromatic radical, possible radicals are, in particular, 5-membered or 6-membered heterocyclic-aromatic, optionally benzo-condensed ring systems which contain O, N and/or S.

Carbocyclic-aromatic or heterocyclic-aromatic radicals represented by $Q_1$ can also be substituted, for example by nitro groups, alkyl groups with 1 to 4 carbon atoms, trifluoromethyl groups, halogen atoms, especially chlorine, or silyl, sulphonic acid or sulphamoyl groups.

Preferably, the individual Q independently of one another represent an unsubstituted alkylene group with 2 to 10 carbon atoms, a bis-(methylene)-cyclohexane group, an unsubstituted monocyclic araliphatic radical or a monocyclic or non-condensed bicyclic aromatic radical which is optionally substituted by halogen atoms or by alkyl or alkoxy groups, each with 1 to 4 carbon atoms, whilst the individual $Q_1$ independently of one another denote an unsubstituted alkylene group with 4 to 10 carbon atoms, an unsubstituted monocyclic aromatic radical, a condensed bicyclic aromatic radical or a non-condensed bicyclic aromatic radical and, in the case of the latter, the aromatic nuclei are bonded to one another via the bridge member —O—, —CO— or —SO$_2$—.

The following polymers are particularly preferred: polymers which consist of 1–50 mol % of structural elements of the formula I, in which the —COR$_1$ groups are in the 3,5-position of the benzene ring, and of 50–99 mol % of structural elements of the formula II, wherein $Z_1$ and $Z_3$ each denote hydrogen, $Z_2$ denotes hydrogen or methyl and $Z_4$ denotes —COO— alkyl with 1–10 carbon atoms in the alkyl part, or $Z_1$, $Z_2$ and $Z_3$ each denote hydrogen and $Z_4$ denotes —CN, chlorine, phenyl or —OCOCH$_3$, $A_1$ represents the group

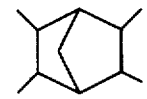

or the group

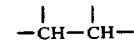

and $R_1$ represents —OH or an alkoxy group with 1-12, and especially 1-4, carbon atoms; and polymers, including the corresponding cyclised derivatives, which consist of 3-50 mol % of structural elements of the formula III, in which the —CO— groups are in the 3,5-position of the benzene ring, and of 50-97 mol % of structural elements of the formula IV, wherein $A_2$ denotes the group

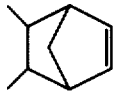

or the group —CH=CH— and X, Y, $m$, $n$, Q and $Q_1$ have the following meanings: X and Y each denote —NH—, Q denotes the 1,3- or 1,4-phenylene group, the 4,4'-diphenylmethane radical or the 4,4'-diphenyl ether radical and, when $m$ and $n = 1$, $Q_1$ denotes the 1,3- or 1,4-phenylene group or an unsubstituted alkylene group with 4-10 carbon atoms and, when $m = 1$ and $n = 2$, $Q_1$ denotes a benzene ring and, when $m$ and $n = 2$, $Q_1$ denotes a benzene ring or the benzophenone ring system; X and Y each denote —O—, Q denotes the 1,3- or 1,4-phenylene group or an unsubstituted alkylene group with 2-12 carbon atoms, $m$ and $n$ each denote the number 1 and $Q_1$ denotes the 1,3- or 1,4-phenylene group or an unsubstituted alkylene group with 4-10 carbon atoms; or one of X and Y denotes —O— and the other denotes —NH—, Q denotes the 1,3- or 1,4-phenylene group, $m$ and $n$ each denote the number 1 and $Q_1$ denotes the 1,3- or 1,4-phenylene group.

Polymers which consist of 3-50 mol % of structural elements of the formula III, in which the —CO— groups are in the 3,5-position of the benzene ring, and of 50-97 mol % of structural elements of the formula IV, wherein $A_2$ denotes the group

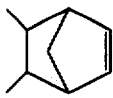

or the group —CH=CH—, X and Y each denote —NH—, $m$ and $n$ each denote the number 1, Q denotes the 1,3- or 1,4-phenylene group and $Q_1$ denotes the 1,3-phenylene group are very particularly preferred.

The starting compounds of the formula Va and Vb can be obtained when an amine of the formula IXa or IXb

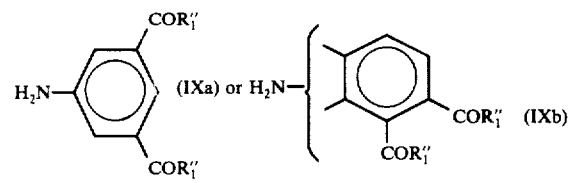

is reacted with an anhydride of the formula X

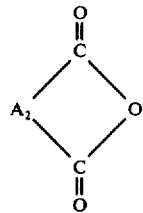

and the resulting amide-carboxylic acid of the formula XIa or XIb

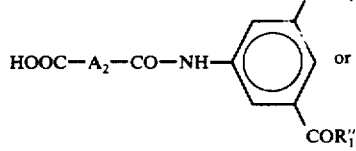

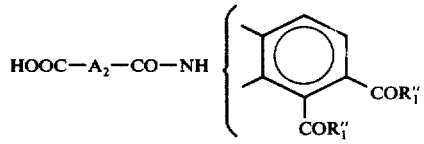

is subsequently cyclised and optionally converted into a derivative, according to the definition, of the formula Va and Vb respectively, for example into the acid chloride.

In the above formulae, $A_2$ has the meaning indicated under formulae I and III. $R_1''$ represents a hydroxyl group, an unsubstituted phenoxy group or a substituted phenoxy group which is free from electronegative substituents, such as nitro groups or halogen atoms, an alkoxy group with 1-18 carbon atoms or a —O$^-$M$^+$ group, in which M$^+$ has the meaning indicated in the foregoing text.

The reaction of the amine of the formula IXa or IXb with the anhydride of the formula X can be carried out in the melt or in an aqueous, aqueous-organic or organic medium.

Customary catalysts, such as sodium acetate or triethylamine, and/or dehydrating agents, for example acetic anhydride, can be used for the cyclisation of the amide-carboxylic acids of the formula XIa or XIb. However, the cyclisation (imide formation) can also be carried out by the action of heat.

The conversion of the resulting imidyl compounds of the formula Va or Vb into other derivatives according to the definition can be carried out in a manner which is in itself known. Acid chlorides can be manufactured, for example, by reacting compounds of the formula Va, wherein $R_1 =$ —OH or —O$^-$M$^+$, with suitable chlorinating agents, such as thionyl chloride.

Esters, and in particular also compounds of the formula Va or Vb wherein the $R_1$ s and $R_1'$ s denote phenoxy groups which contain electronegative substituents, such as nitro groups or halogen atoms, can be manufactured, for example, by reacting corresponding compounds in which $R_1$ or $R_1' =$ —OH with suitable alcohols or by transesterification. Furthermore, it is possible to convert compounds of the formula Va or Vb wherein $A_2$ represents —CH=CH— into compounds of the formulae Va or Vb wherein $A_2$ denotes the group

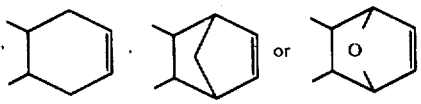

by an addition reaction with 1,3-butadiene, cyclopentadiene or furane.

The compounds of the formulae VI to VIII which can be employed in the process according to the invention are known or can be manufactured according to methods which are in themselves known. Examples which may be mentioned are:

COMPOUNDS OF THE FORMULA VI

Ethylene, propylene, 1-butene isoprene, 1,4-butadiene, vinyl chloride, vinylidene chloride, acrylic acid, methacrylic acid, acrylonitrile, methacrylonitrile, chloroacrylonitrile, styrene, methylstyrenes which are substituted in the nucleus, 4-methoxystyrene, vinylcyclohexane, acrylic acid methyl, ethyl, isopropyl, 2-ethylhexyl and phenyl ester and methacrylic acid methyl, ethyl, isopropyl, 2-ethylhexyl and phenyl ester, vinyl acetate and vinyl propionate, acrylic acid 2,3-epoxypropyl ester and methacrylic acid 2,3-epoxypropyl ester, benzoic acid vinyl ester, 2-vinylpyridine, 4-vinylpyridine, vinylimidazole, vinylpyrrolidone, methyl vinyl ketone, ethyl vinyl ketone, ethyl vinyl ether, n-butyl vinyl ether and divinylbenzene and di-, tri- or tetraacrylates and -methacrylates of polyhydric alkanols.

COMPOUNDS OF THE FORMULA VII

Malonic acid, dimethylmalonic acid, succinic acid, glutaric acid, adipic acid, suberic acid, sebacic acid and dodecanedicarboxylic acid, 1,3-cyclopentane-dicarboxylic acid, hexahydroisophthalic acid, hexahydroterephthalic acid, terephthalic acid, isophthalic acid, 4,4'-dicarboxydiphenylethane, naphthalene-2,6-dicarboxylic acid, thiophene-2,45-dicarboxylic acid, pyridine-2,3-dicarboxylic acid and the corresponding di-chlorides and diesters according to the definition; trimellitic acid 1,2-anhydride-chloride (1,3-dioxo-benzo[c]-oxalane-5-carboxylic acid chloride), trimellitic anhydride, trimellitic acid and esters according to the definition; pyromellitic dianhydride, 3,3',4,4'-benzophenone-tetracarboxylic acid dianhydride, 2,3,3',4'-benzophenone-tetracarboxylic acid dianhydride, 2,2',3,3'-benzophenone-tetracarboxylic acid dianhydride, 3,3',4,4'-diphenyl-tetracarboxylic acid dianhydride, bis-(2,3-dicarboxyphenyl)-methane dianhydride, bis-(2,5,6-trifluoro-3,4-dicarboxyphenyl)-methane dianhydride, 2,2-bis-(2,3-dicarboxyphenyl)-propane dianhydride, bis-(3,4-dicarboxyphenyl) ether dianhydride, bis-(3,4-dicarboxyphenyl)-sulphone dianhydride, N,N-(3,4-dicarboxyphenyl)-N-methylamine dianhydride, bis-(3,4-dicarboxyphenyl)-diethylsilane dianhydride, 2,3,6,7- and 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride.

COMPOUNDS OF THE FORMULA VIII (Diamines, diols and amino-alcohols) o-, m- and p-phenylenediamine, diaminotoluenes such as 2,4-diaminotoluene, 1,4-diamino-2-methoxybenzene, 2,5-diaminoxylene, 1,3-diamino-4-chlorobenzene, 4,4'-diaminodiphenylmethane, 4,4'-diaminodiphenyl ether, 4,4'-diaminodiphenyl thioether, 4,4'-diaminodiphenyl-sulphone, 2,2'-diaminobenzophenone, 4,4'-diaminodiphenylurea and 1,8- or 1,5-diaminonaphthalene; 2,6-diaminopyridine, 1,4-piperazine, 2,4-diaminopyrimidine, 2,4-diamino-s-triazine, di-, tri-, tetra-, hexa-, hepta-, octa- and deca-methylenediamine, 2,2-dimethylpropylenediamine, 2,5-dimethylhexamethylenediamine, 4,4-dimethylheptamethylenediamine, 3-methylheptamethylenediamine, 3-methoxyhexamethyldiamine, 2,11-diaminododecane, 2,2,4- and 2,4,4-trimethylhexamethylenediamine, 1,2-bis-(3-aminopropoxy)-ethane, N,N'-dimethylethylenediamine, N,N'-dimethyl-1,6-diaminohexane and the diamines of the formulae $H_2N(CH_2)_3O(CH_2)_2O(CH_2)_3NH_2$ and $H_2N(CH_2)_3S(CH_2)_3NH_2$; 1,4-diaminocyclohexane, 1,4-bis-(2-methyl-4-aminopentyl)-benzene and 1,4-bis-(aminomethyl)-benzene; ethylene glycol, propylene glycol, 1,3-propanediol, 1,4-, 1,3- and 2,3-butanediol, 2,2-dimethyl-1,3-propanediol (neopentyl glycol), 1,5- and 2,4-pentanediol, 1,6- and 2,5-hexanediol, 1,8-octanediol, 1,12-dodecanediol, 2-ethyl-2-butyl-1,3-propanediol, 1,10-decanediol, diethylene glycol, dipropylene glycol and N,N-bis-(2-hydroxyethyl)-ethylamine (N-ethyldiethanolamine); ethanolamine, 3-amino-1-propanol, 2-amino-1-butanol, 4-amino-1-butanol, 5-amino-1-pentanol and 6-amino-1-hexanol; 1,2-, 1,3- and 1,4-cyclohexanediol, 1,4-bis-(hydroxymethyl)-cyclohexane and 4-amino-cyclohexanol; 1,2-, 1,3- and 1,4-dihydroxybenzene, 1,2-dihydroxy-3-methoxybenzene, 1,2-dihydroxy-4-nitrobenzene, 2,6-dihydroxytoluene, 1,3-, 1,4-, 1,5- and 1,6-dihydroxynaphthalene, 2,2'-dihydroxybiphenyl, 4,4'-dihydroxybiphenyl, 4,4'-dihydroxy-diphenylmethane, 2,2'-bis-(4-hydroxyphenyl)-propane (bisphenol A), 2,2'-and 4,4'-dihydroxydiphenyl ether and 3,3'- and 4,4'-dihydroxy-diphenylsulphone and 2,4-dihydroxy-5-methyl-pyrimidine, 2,3-dihydroxypyridine and 3,6-dihydroxy-pyridazine. - and Advantageously, compounds of the formula Va wherein $R_1$ denotes —OH, an unsubstituted phenoxy group or an alkoxy group with 1-12, and especially 1-4, carbon atoms are used for the polymerisation with compounds of the formula VI.

Compounds of the formula Vb wherein $R_1'$ denotes a chlorine atom, an unsubstituted phenoxy group or an alkoxy group with 1-12, and especially 1-4, carbon atoms, and acid dichlorides, anhydride-chlorides of dianhydrides of the formula VII are preferably employed for the polycondensation reactions according to process variant (b).

The homopolymerisation of the compounds of the formula Va, or their copolymerisation with compounds of the formula VI can be carried out in a manner which is in itself known, for example in the presence of customary cationic or anionic initiators or in the presence of mixed catalysts (Ziegler-Natta catalysts). Free-radical polymerisation is preferred. In this case it is appropriate to use about 0.01 to 5% by weight, preferably 0.01 to 1.5% by weight, based on the total weight of the monomers, of free-radical initiators which are in themselves known, such as inorganic and organic peroxides or azo compounds, for example hydrogen peroxide, potassium peroxydisulphate, tert.-butyl hydroperoxide, di-tert.-butyl peroxide, peracetic acid, benzoyl peroxide, diacyl peroxides, cumene hydroperoxide, tert.-butyl perbenzoate, tert.-alkyl peroxycarbonates and α,α'-azo-isobutyronitrile. The reaction temperature for free-radical polymerisation is generally about 30° – 100° C.

Redox systems, for example mixtures of peroxides, such as hydrogen peroxide, and a reducing agent, such as divalent iron ions, can also be used, in the abovementioned concentrations, for free-radical polymerisation in the cold.

The polymerisation can be carried out in a homogeneous phase, for example in bulk (block polymerisation) or in solution, or in a heterogeneous phase, that is to say as precipitation polymerisation, emulsion polymerisation or suspension polymerisation. Polymerisation in solution is preferred.

Examples of suitable solvents are water; optionally chlorinated aromatic hydrocarbons, such as benzene, toluene, xylenes and chlorobenzene; chlorinated aliphatic hydrocarbons, such as methylene chloride, chloroform, tetrachloroethane and tetrachloroethylene; aliphatic and cycloaliphatic ketones, such as acetone, methyl ethyl ketone, cyclopentanone and cyclohexanone; cyclic ethers, such as tetrahydrofurane, tetrahydropyrane and dioxane; cyclic amides, such as N-methyl-2-pyrrolidone, N-acetyl-2-pyrrolidone and N-methyl-ε-caprolactam; N,N-dialkylamides of aliphatic monocarboxylic acids with 1–3 carbon atoms in the acid part, such as N,N-dimethylformamide, N,N-dimethylacetamide, N,N-diethylacetamide and N,N-dimethylmethoxyacetamide; alkyl esters of aliphatic monocarboxylic acids with a total of 2–6 carbon atoms, such as formic acid methyl, ethyl and n-butyl ester or acetic acid methyl, ethyl and n-butyl ester; hexamethylphosphoric acid triamide (hexametapol); N,N,N',N'-tetramethylurea, tetrahydrothiophene dioxide (sulpholane) and dialkylsulphoxides, sulphoxides, such as dimethylsulphoxide and diethylsulphoxide.

Mixtures of such solvents can also be used.

Preferred solvents are water, benzene, toluene, N,N-dimethylformamide, N,N-dimethylacetamide, ethyl acetate, tetrahydrofurane, chloroform and methyl ethyl ketone as well as mixtures thereof.

The polycondensation of compounds of the formula Vb with compounds of the formula VIII and optionally one or more compounds of the formula VII is also carried out in a manner which is in itself known, appropriately at temperatures of about −50° C to +300° C. The reaction can be carried out in the melt or, preferably, in an inert organic solvent or a solvent mixture, optionally with the addition of known polymerisation inhibitors, such as hydroquinones, pyrocatechol or cresols, for example di-tert.-butylcresol. Temperatures of −20° C to +50° C are preferred for the polycondensation in solution.

Organic solvents which can be employed are those mentioned above. Preferred solvents for the reaction with diamines or amino-alcohols of the formula VIII are N,N-dialkylamides of aliphatic monocarboxylic acids with 1 – 3 carbon atoms in the acid part, especially N,N-dimethylacetamide, and also cyclic amides, such as N-methyl-pyrrolidone.

Preferably, chlorinated aromatic or aliphatic hydrocarbons, such as chlorobenzene, methylene chloride, chloroform, tetrachloroethane and tetrachloroethylene, or N,N-dialkylamides of aliphatic monocarboxylic acids with 1-3 carbon atoms in the acid part, and in particular N,N-dimethylacetamide or chloroform, are employed for the reaction with diols of the formula VIII.

The polycondensation of compounds of the formula Vb with diols of the formula VIII and optionally one or more compounds of the formula VII can also be carried out in the melt in the presence of customary polycondensation catalysts at temperatures of about 50° to 275° C and under a blanketing gas, such as nitrogen. Catalysts which can be used are, for example, antimony compounds, such as antimony triacetate and antimony trioxide; zinc acetate, calcium acetate and germanium compounds.

The hydrochloric acid obtained during the polycondensation of compounds of the formula Vb, wherein $R_1$ = chlorine, with compounds of the formula VIII and optionally one or more compounds of the formula VII can be removed by neutralisation with basic substances, such as calcium hydroxide and triethylamine, or by reaction with an epoxy compound, such as ethylene oxide or propylene oxide, and by washing out with suitable solvents, for example water.

Polyamide-acid polymers or polyamide-amide-acid polymers, that is to say polymers which consist of structural elements of the formula III and IV wherein $m$ and/or $n$ denote the number 2 can, if desired, be imidised, prior to crosslinking, in a known manner, chemically or by the action of heat, for example by gentle treatment with a dehydrating agent on its own or mixed with a tertiary amine. Examples of reagents which can be used are acetic anhydride, propionic anhydride and dicyclohexylcarbodiimide or mixtures of acetic anhydride and triethylamine. In order to avoid premature crosslinking, the reaction should be carried out at temperatures which are as low as possible, preferably at a temperature below 50° C and especially between about −20° C and +20° C.

Crosslinking of the polymers according to the invention is effected in a manner which is in itself known, for example by the action of heat, by heating to temperatures of about 50° to 350° C, or chemically. Polymers which consist of structural elements of the formulae I and II can, for example, be crosslinked in the presence of diamines, diols or aminoalcohols, for example those of the abovementioned formula VIII

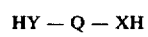

HY — Q — XH

Crosslinking is customarily carried out at temperatures of up to about 250° C.

Polycondensation products which consist of structural elements of the formula III and IV can be crosslinked in the presence of vinyl compounds, for example those of the abovementioned formula VI

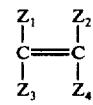

and optionally in the presence of free-radical initiators, at temperatures between about 50° and 200° C.

Finally, the polycondensation products according to the invention can also be crosslinked by the action of light.

According to the process of the invention, it is possible to manufacture polymers which, within the scope of the definition, have any desired number, and statistical distribution, of the crosslinkable groups and to convert these polymers into polymers which have a degree of crosslinking suited to the particular application.

The polymers according to the invention, and especially those which contain 3 – 50 mol % of structural elements of the formula I or III, are distinguished by good processability and especially by good solubility in the customary organic solvents, such as N,N-dimethylformamide, N,N-dimethylacetamide, chloroform and tetrachloroethane, and improved flow properties in the melt. Thus, for example, polyamides, according to the invention, which consist of structural elements of the formula III and IV, wherein Q and $Q_1$ represent a 1,3-phenylene group and *m* and *n* each represent the number 1, are generally soluble in N,N-dimethylacetamide even without the addition of a salt, such as LiCl.

The polymers are suitable for the manufacture, in a manner which is in itself known and if desired with the use of customary additives, such as pigments, fillers and the like, of industrial products, such as shaped articles of various types, for example fibres, thin and thick films, coating compositions, lacquers, foams, adhesives, laminating resins, laminates, moulding powders, compression mouldings and the like. The products obtained after crosslinking are generally resistant to solvents and exhibit good mechanical, electrical and/or thermal properties.

EXAMPLE 1

Copolyamide of:

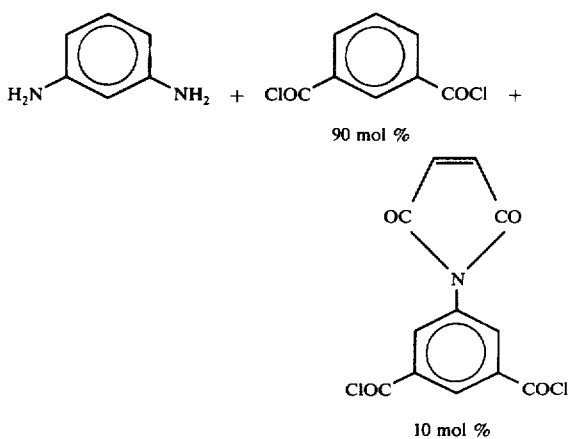

(a) Preparation of the acid chloride mixture 219.26 g (1.08 mols) of isophthalic acid dichloride and 35.78 g (0.12 mol) of 5-maleimidyl-isophthalic acid dichloride are melted together at 70° C, the melt is allowed to solidify and the solid is then crumbled.

(b) Condensation 107.35 g (0.993 mol) of m-phenylenediamine are dissolved in 950 ml of N,N-dimethylacetamide (DMA), the solution is cooled to $\leq$ −20° C using a bath of solid carbon dioxide and 212.70 g (1.0 mol) of the above acid chloride mixture in the solid form are added all at once, whilst stirring. The cooling bath is removed, whereupon the reaction solution warms to 30°–50° C, dimethylacetamide hydrochloride separating out and the viscosity increasing greatly. The temperature is kept below 50° C by means of an ice bath. The reaction mixture is then allowed to cool down to 27° C and the highly viscous reaction product is stirred for a further 2 hours. The resulting polymer is precipitated, optionally after dilution with N,N-dimethylacetamide, in a mixer by means of water, washed with water until neutral and dried in a vacuum drying cabinet at 120° C for 24 hours. A pale yellowish, fibrous, crosslinkable copolyamide which has an inherent viscosity $\mu_{inh} = 1.21$ dl/g (0.5% by weight in DMA at 25° C) is obtained in quantitative yield. It is soluble in N,N-dimethylacetamide and N,N-dimethylformamide, without additives such as lithium chloride, and is suitable for the manufacture of films and fibres in a manner which is in itself known.

The polymer can be crosslinked by heating to 200° C for several hours or by irradiation with UV light.

EXAMPLE 2

Example 1 is repeated but the highly viscous reaction solution obtained after the polycondensation is neutralised by adding 205 g (2.0 mols) of triethylamine in 700 ml of DMA and the triethylamine hydrochloride which has precipitated out is filtered off. A clear polymer solution which has an inherent viscosity of 1.17 dl/g (0.5% by weight in DMA at 25° C) is obtained and can be spun direct to give fibres or processed direct to give films.

EXAMPLE 3

Copolyamide of:

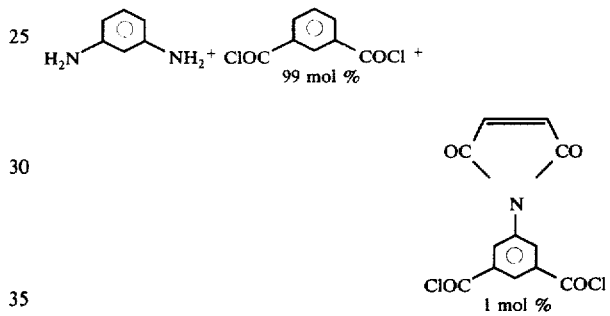

The acid chloride mixture is prepared as indicated in Example 1, using 241.20 g (1.187 mole) of isophthalic acid dichloride and 3.58 g (0.012 mol) of 5-maleimidyl-isophthalic acid dichloride.

107.35 g (0.993 mol) of m-phenylenediamine are polycondensed, in the manner described in Example 1, with 203.95 g (1.0 mol) of the resulting acid chloride mixture in 950 ml of DMA. After precipitating from water, 262 g of a pale yellowish, fibrous copolyamide which has an inherent viscosity of 1.16 dl/g (0.5% by weight in DMA at 25° C) are obtained. The polymer obtained dissolves, without additives, on slight warming in N,N-dimethylacetamide or N,N-dimethylformamide and can be processed in the customary manner to give films or fibres.

EXAMPLE 4

An acid chloride mixture (mol %: 70:30) is prepared, as described in Example 1, from 17.054 g (0.0839 mol) of isophthalic acid dichloride and 10.730 g (0.0359 mol) of 5-maleimidyl-isophthalic acid dichloride.

10.738 g (0.0993 mol) of m-phenylenediamine are polycondensed, in accordance with the process described in Example 1, with 23.170 g (1.0 mol) of the resulting acid chloride mixture in 94 ml of DMA. 24.6 g of a slightly yellowish, fibrous copolyamide which has an inherent viscosity of 1.28 dl/g (0.5% by weight in DMA at 25° C) are obtained. The copolyamide obtained is very readily soluble in N,N-dimethylacetamide and N,N-dimethylformamide and is suitable, in particular, for the production of films.

On thermogravimetric analysis, the polymer shows a loss in weight of 10% at 400° C (rate of heating 20° C/minute; air atmosphere). It can be crosslinked by heating to 200° C for several hours or by irradiation with UV light.

EXAMPLE 5

107.38 g (0.993 mol) of m-phenylenediamine are dissolved in 1,000 ml of DMA and the solution is cooled to −20° C. A liquid mixture of 192.88 g (0.95 mol) of isophthalic acid dichloride and 14.904 g (0.05 mol) of 5-maleimidyl-isophthalic acid dichloride is added, whilst stirring and cooling with solid carbon dioxide, from a dropping funnel thermostatically controlled at 70° C, at such a rate that the temperature of the reaction mixture is about −20° C during the addition. Residues of acid chloride remaining on the wall of the dropping funnel are rinsed out with a little tetramethylurea and the reaction mixture is stirred for 3 hours without cooling. A highly viscous copolyamide solution is obtained and can be neutralised by adding triethylamine or precipitated with water in a mixer. Inherent viscosity of the polymer = 1.24 dl/g (0.5% by weight in DMA at 25° C).

The polymer is soluble in N,N-dimethylformamide and N,N-dimethylacetamide without the addition of a salt and crosslinks on heating to about 200° C or on irradiation with UV light.

EXAMPLE 6

Copolyamide of

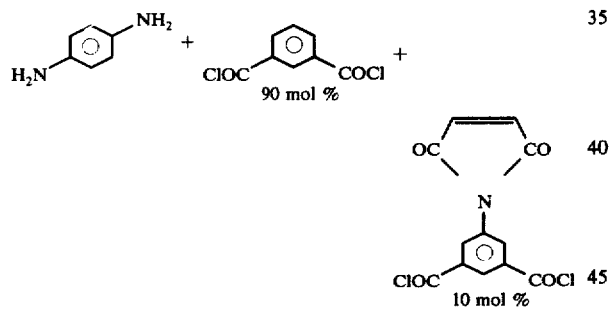

The acid chloride mixture is prepared as indicated in Example 1.

21.47 g (0.1985 mol) of p-phenylenediamine are dissolved in 190 ml of DMA. The solution is cooled to 0° C and 42.51 g (0.2 mol) of the above acid chloride mixture in the solid form are then added. The reaction mixture is stirred for 3 hours, whilst cooling with ice, and, after an initial rise to 80° C, the temperature of the reaction mixture falls again to 20°–25° C. The resulting highly viscous solution is diluted with DMA and the condensation product is precipitated from water, as described in Example 1. A crosslinkable, fibrous copolyamide, which is soluble in DMA with the addition of 5% by weight of lithium chloride, is obtained in quantitative yield. Inherent viscosity of the copolyamide = 1.19 dl/g (0.5% by weight in DMA containing 5% by weight of LiCl at 25° C).

EXAMPLE 7

Copolyamide of

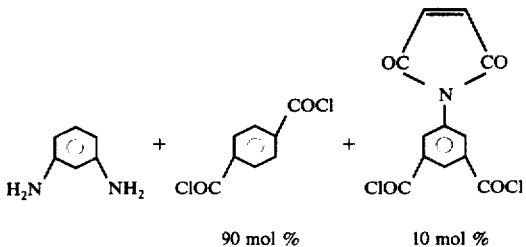

An acid chloride mixture is prepared, as described in Example 1, from 43.85 g (0.2159 mol) of terephthalic acid dichloride and 7.16 g (0.0240 mol) of 5-maleimidyl-isophthalic acid dichloride.

21.47 g (0.1985 mol) of m-phenylenediamine are dissolved in 190 ml of DMA and subsequently polycondensed, in the manner described in Example 1, with 42.51 g (0.2 mol) of the above acid chloride mixture. 48.0 g of a fibrous, crosslinkable copolyamide which has an inherent viscosity of 1.62 dl/g (0.5% by weight in DMA containing 5% by weight of LiCl, at 25° C) are obtained. The polymer obtained is soluble in N,N-dimethylacetamide and N,N-dimethylformamide with the addition of 5% by weight of lithium chloride.

EXAMPLE 8

Polyamide of

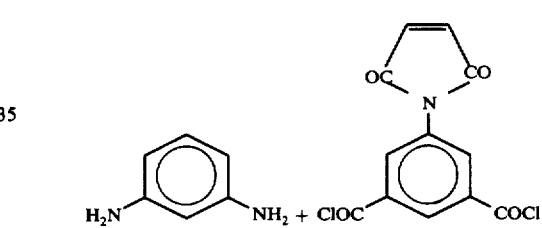

In accordance with the procedure described in Example 1, 1.081 g (10 mmols) of m-phenylenediamine are subjected to a condensation reaction with 2.981 g (10 mmols) of 5-maleimidyl-isophthalic acid dichloride in 10 ml of DMA. After precipitating with water, a yellowish, fibrous crosslinkable polyamide (3.5 g) which has an inherent viscosity of 0.77 dl/g (0.5% by weight in DMA at 25° C) is obtained.

EXAMPLE 9

Copolyamide of:

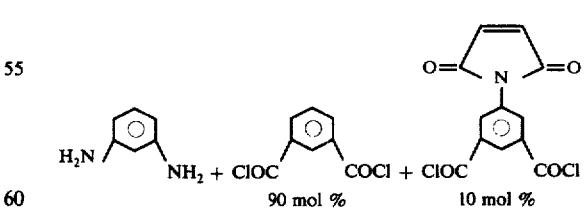

107.35 g (0.993 mol) of m-phenylenediamine are dissolved in 1,000 ml of N,N-dimethylacetamide. The reaction solution is cooled to −22° C. 182.8 g (0.90 mol) of liquid isophthalic acid dichloride are then added dropwise in the course of about 30 minutes, at −20° C to −10° C, whilst stirring well. Subsequently, 30.0 g (0.101 mol) of 5-maleimidylisophthalic acid dichloride are added, the cooling bath is removed and the reaction mixture is stirred for a further 4 hours. A highly viscous polymer, which can be stirred only with difficulty, forms. The polymer is soluble in DMA without the addition of a salt and can be processed in the customary manner to give fibres and films; inherent viscosity = 1.62 dl/g (0.5% by weight in DMA at 25° C) and 2.0 dl/g (0.5% by weight in $H_2SO_4$).

EXAMPLE 10

Copolyamide of:

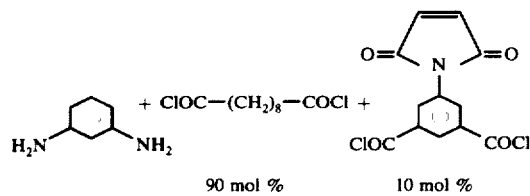

21.53 g (0.09 mol) of freshly distilled sebacic acid dichloride are added dropwise, at $-20°$ C to $-10°$ C, to 10.74 g (0.0993 mol) of m-phenylenediamine in 200 ml of N,N-dimethylacetamide, whilst stirring and under a blanketing gas (nitrogen). The dropping funnel is flushed with a little tetramethylurea.

2.99 g (0.01 mol) of 5-maleimidyl-isophthalic acid dichloride are then added, the cooling bath is removed and the reaction mixture is stirred for 3 hours at 20°-25° C. A highly viscous, almost colourless polymer solution, from which it is possible to isolate the polymer, for example by precipitating out in water, is obtained. Inherent viscosity = 2.03 dl/g (0.5% by weight in DMA at 25° C). The polymer can be processed in a manner which is in itself known to give films and fibres; shaped articles can also be produced from the polymer by compression moulding at temperatures between 200° and 230° C.

The 5-maleimidyl-isophthalic acid dichloride used in Examples 1 - 10 is prepared as follows:

(i) 211.2 g (1.0 mol) of the disodium salt of 5-nitroisophthalic acid are dissolved in 1,590 g of aqueous sodium hydroxide (90.0 g of sodium hydroxide in 1,500 ml of water), the solution is rendered neutral with 15 ml of anhydrous acetic acid and the hydrogenation reaction is carried out in the presence of 10 g of a palladium-on-charcoal catalyst (5% by weight of Pd). The catalyst is filtered off and a solution of 118.0 g (1.2 mols) of maleic anhydride in 150 ml of dioxane is added to the filtrate in the course of 2 hours, whilst stirring vigorously. A white suspension forms and is stirred overnight at 20°-25° C, 250 ml of anhydrous acetic acid are then added and the mixture is stirred for a further 2 hours. The amide-acid which has precipitated is filtered off, washed with water and methanol and dried in vacuo at 30° C for 24 hours. The reaction product (315 g) is then heated, whilst stirring in 2,500 ml of acetic anhydride, to 80°-85° C for 30 minutes. About 1.8 l of liquid (acetic acid + acetic anhydride) are distilled off under a water-pump vacuum. The residual suspension is poured onto 2,000 g of ice and the mixture is stirred overnight. The 5-maleimidyl-isophthalic acid which has precipitated out is filtered off, washed with water and methanol and dried in vacuo at 60° C for 12 hours. 210 g (80% of theory, based on the nitro-isophthalic acid) of white, crystalline 5-maleimidyl-isophthalic acid are obtained; melting point >300° C.

NMR spectrum (60 megahertz, dimethylsulphoxide-$d_6$): $\delta$ = 7.23 ppm; 2H (methine protons).

Analysis for $C_{12}H_7NO_6 \cdot 0.2\ H_2O$ (molecular weight 264.79): calculated: C 54.42% H 2.85% N 5.29% $H_2O$ 1.39%; found: C 54.16% H 2.85% N 5.3% $H_2O$ 1.39%.

(ii) 210 g (0.79 mol) of this 5-maleimidyl-isophthalic acid in 1,200 ml of thionyl chloride, with the addition of a catalytic amount of pyridine (about 25 drops), are boiled under reflux until a solution has formed (4 - 7 hours). Excess thionyl chloride is distilled off under reduced pressure. The residue is dissolved in 2 liters of a hot solvent mixture of cyclohexane and benzene (volume ratio 4:1), the solution is decanted off from a small amount of insoluble resin and left to stand until crystallisation occurs. The reaction product which has precipitated is filtered off and dried in vacuo at 40° C for 24 hours. 202 g of pale yellowish 5-maleimidyl-isophthalic acid dichloride are obtained; melting point 93°-99° C. A further 7.3 g of the yellowish acid chloride can be isolated from the concentrated mother liquor; melting point 92°-97° C. Total yield = 209 g (70% of theory, based on the 5-nitro-isophthalic acid employed).

NMR spectrum (60 megahertz, $CDCl_3$): $\delta$ = 7.00 ppm; 2H (methine protons).

Analysis for $C_{12}H_5NO_4Cl_2$ (molecular weight 298.08): calculated: C 48.35% H 1.69% N 4.70% Cl 23.79%; found: C 48.45% H 1.91% N 4.71% Cl 23.48%.

EXAMPLE 11

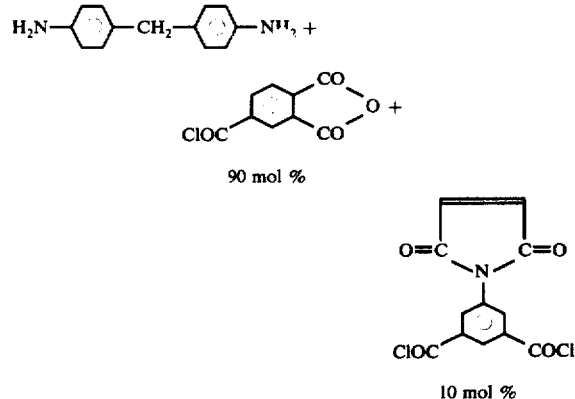

19.69 g (0.0993 mol) of 4,4'-diaminodiphenylmethane are dissolved in 150 ml of N,N-dimethylacetamide. The solution is cooled to $-15°$ C. 18.95 g (0.09 mol) of trimellitic anhydride-chloride and 2.98 g (0.01 mol) of 5-maleimidyl-isophthalic acid dichloride in the solid form are then added successively and the resulting viscous solution is stirred for 1 hour, whilst cooling with an ice bath. 20.2 g (0.2 mol) of triethylamine in 50 ml of DMA are then added, whilst stirring, and the hydrochloride which has precipitated is separated off by means of a cloth filter. A clear solution of the polymer in DMA is obtained and films can be produced from this. After drying these films for 24 hours at 210° C, transparent, yellowish thick films which are insoluble in the customary solvents are obtained.

EXAMPLE 12

10.91 g (0.1 mol) of p-aminophenol are dissolved in 200 ml of DMA. The solution is cooled to $-20°$ C. 10.15 g (0.05 mol) of solid isophthalic acid dichloride are added, whilst stirring vigorously, and the reaction mixture is stirred for a further 10 minutes. 20.2 g (0.2 mol) of triethylamine are then added, the mixture is again cooled to −20° C and 14.91 g (0.05 mol) of 5-maleimidyl-isophthalic acid dichloride are added. The cooling bath is removed and the reaction mixture is stirred for a further 2 hours. The hydrochloride is separated off by filtration. The resulting polymer is precipitated in water and dried at 100° C under a high vacuum. A brownish coloured product which has an inherent viscosity of 0.59 dl/g (0.5% by weight in DMA 25° C) is obtained and can be crosslinked by heating to 200° C for several hours.

EXAMPLE 13

7.93 g (0.04 mol) of 4,4′-diaminodiphenylmethane are dissolved in 200 ml of anhydrous DMA under a nitrogen atmosphere, in a sulphonation flask. This solution is cooled to −15° C to −20° C. A mixture of 10.31 g (0.032 mol) of 3,3′,4,4′-benzophenone-tetracarboxylic acid dianhydride and 2.38 g (0.008 mol) of 5-maleimidyl-isophthalic acid dichloride in the solid form is then added in portions, and whilst stirring the reaction mixture. After 30 minutes, the means of cooling are removed and the solution is stirred for a further 1 hour at 20°-25° C and, in order to produce films, is cast onto aluminium foils and heated as follows: 4 hours at 80° C/20 mm Hg, 30 minutes each at 100° C/20 mm Hg, 120° C/20 mm Hg, 140° C/20 mm Hg, 160° C/10$^{-1}$ mm Hg and 180° C/10$^{-1}$ mm Hg and 1 hour at 200° C/10$^{-1}$ mm Hg. After dissolving off the aluminium foil with dilute hydrochloric acid, transparent, flexible films of good mechanical strength are obtained.

EXAMPLE 14

A mixture of 18 g (0.2 mol) of 1,4-butanediol, 28.9 g (0.1 mol) of 4-maleimidyl-phthalic acid dimethyl ester and 0.045 g of calcium acetate is heated to 100° C for 12 hours, whilst stirring and passing nitrogen through the mixture. After cooling, the reaction mixture is diluted with 300 ml of chloroform, 20.3 g (0.1 mol) of isophthalic acid dichloride are added in portions and the mixture is heated under reflux for 2 hours. In order to produce films, the resulting polymer solution is cast onto an aluminium foil and the solvent is evaporated in a vacuum oven.

EXAMPLE 15

43.02 g (0.18 mol) of sebacic acid dichloride are added dropwise to 18 g (0.2 mol) of 1,4-butanediol, whilst passing nitrogen through the mixture and stirring vigorously. During the addition, the internal temperature is kept below 70° C by cooling. Subsequently, the reaction mixture is warmed to 100° C and 5.96 g (0.02 mol) of 5-maleimidyl-isophthalic acid dichloride in the solid form are added and the mixture is then stirred for 30 minutes under normal pressure and subsequently for 30 minutes under a waterpump vacuum. On cooling, the polycondensate solidifies to give an opaque mass which has a softening point of about 65° C.

100 mg of $\alpha,\alpha'$-azo-isobutytonitrile are added to 20 ml amounts of a 10% strength, 20% strength and 50% strength solution of the above polymer in styrene and the mixtures are kept at 70° C for 24 hours, under nitrogen. An opaque, insoluble moulding is obtained.

EXAMPLE 16

11.01 g (0.1 mol) of resorcinol and 25.3 g (0.25 mol) of triethylamine are dissolved in 300 ml of DMA and the solution is cooled to −15° C. A melt of 18.27 g (0.09 mol) of isophthalic acid dichloride and 2.98 g (0.01 mol) of 5-maleimidyl-isophthalic acid dichloride is added dropwise to this solution, whilst stirring. The cooling bath is removed and the reaction solution is stirred for 2 hours, during which time the internal temperature rises to 20°-25° C. The polymer is precipitated by stirring the solution into 2.5 l of water and is washed several times with water and dried in vacuo at 150° C.

The polymer obtained is introduced into a compression mould for circular discs, which has been prewarmed to 270° c, and moulded for 5 minutes at this temperature and under a pressure of 100 kg/cm$^2$. Strong, transparent mouldings are obtained.

EXAMPLE 17

A melt of 18.27 g (0.09 mol) of isophthalic acid dichloride and 2.98 g (0.01 mol) of 5-maleimidyl-isophthalic acid dichloride is added dropwise, at −15° C, whilst stirring, to a solution of 9.0 g (0.1 mol) of 1,4-butanediol and 25.3 g (0.25 mol) of triethylamine in 300 ml of DMA. The cooling bath is removed and the reaction solution is stirred for a further 2 hours, during which time the temperature of the solution gradually rises to 20°-25° C. The reaction solution is stirred into 2.5 l of water and the product which has precipitated is filtered off, washed several times with water and dried in vacuo at 70° C; softening point about 120° C.

100 mg of $\alpha, \alpha'$-azo-isobutyronitrile are added to 20 ml amounts of a 10% strength, 20% strength and 50% strength solution of the above polymer in styrene and the mixtures are kept at 70° C for 24 hours, under nitrogen. Opaque, insoluble mouldings are obtained.

EXAMPLE 18

31.2 g (0.3 mol) of styrene, 10 g (0.035 mol) of 5-maleimidyl-isophthalic acid dimethyl ester and 0.1 g of $\alpha, \alpha'$-azo-isobutyronitrile are dissolved in 300 ml of DMA and the solution is warmed to 60° C under a nitrogen atmosphere. The resulting reaction solution is stirred at this temperature for 8 hours. The solvent is distilled off. The residue is extracted by boiling three times with benzene and the product is dried in vacuo at 100° C. After this treatment, a copolymer, which, according to elementary analysis, contains 50 mol % of 5-maleimidyl-isophthalic acid dimethyl ester, is obtained.

EXAMPLE 19

For compression moulding, the copolyamide which was obtained according to Example 1 and dried in vacuo is introduced into a compression mould for standard bars, which is heated to 320° C. The pressure is raised to 1,000 kg/cm$^2$ in the course of one minute and is maintained at the above temperature for 5 minutes. After release from the mould, transparent mouldings which have good flexural strength are obtained.

EXAMPLE 20

After drying in vacuo, the copolyamide prepared according to Example 3 is introduced into a compression mould for circular discs, which is heated to 320° C, and pressed for 5 minutes at this temperature under a pressure of 1,000 kg/cm$^2$. After release from the mould, tough, transparent discs with good electrical properties are obtained.

EXAMPLE 21

The copolyamide prepared according to Example 5 is precipitated with water, dried in a vacuum drying cabinet and then dissolved in such an amount of N,N-dimethylacetamide that a 16% strength solution is formed. This solution is spread onto glass plates in order to give thick films. In order to remove the solvent, the thick films are heated in the following way: for 30 minutes at 50° C/30 mm Hg, for 30 minutes at 70° C/30 mm Hg, for 30 minutes at 100° C/30 mm Hg, for 1 hour at 150° C/30 mm Hg and, finally, for 16 hours at 175°–250° C/$10^{-1}$ mm Hg. Transparent films which have excellent mechanical and electrical properties and which are soluble neither in N,N-dimethylacetamide nor in N,N-dimethylacetamide which contains lithium chloride (5% by weight) are obtained.

Films are produced in an analogous manner from the copolyamides obtained according to Examples 1 and 3.

The 5-maleimidyl-isophthalic acid dimethyl ester used in Examples 14 and 18 is prepared as follows:

A mixture of 41.8 g (0.2 mol) of 5-amino-isophthalic acid dimethyl ester and 19.6 g (0.2 mol) of maleic anhydride in 500 ml of methylene chloride is stirred for 4 hours at 20°–25° C. The resulting solid product is filtered off and dried overnight at 40° C. 63.8 g of white amide-acid, which has a melting point of 205°–207° C, are obtained and this is used further without intermediate isolation.

63.8 g (0.2 mol) of the above amide-acid and 4.4 g of anhydrous sodium acetate in 300 ml of acetic anhydride are warmed to 80° C for 30 minutes. The resulting yellowish solution is evaporated to dryness in a rotary evaporator. The brownish residue is extracted by boiling with twice 250 ml of methanol. 42.5 g (70% of theory) of 5-maleimidylisophthalic acid dimethyl ester with a melting point of 188°–190° C remain.

NMR spectrum (60 megahertz, dimethylsulphoxide-$d_6$): $\delta = 6.93$ ppm /2H (methine protons).

Analysis for $C_{14}H_{11}NO_6$ (molecular weight 289.24): calculated: C 58.14% H 3.84% N 4.84% found: C 57.90% H 3.88% N 4.79%.

EXAMPLE 22

Polyester of:

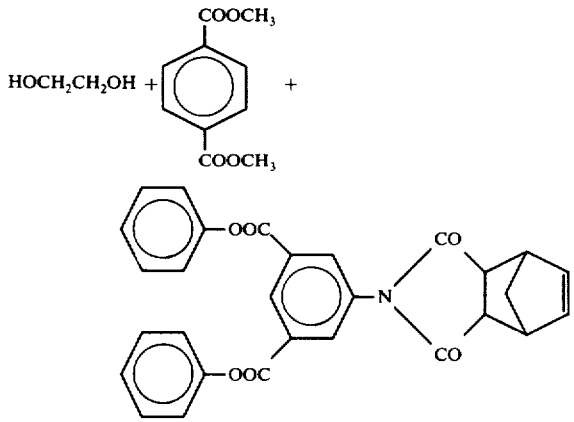

A mixture of 97 g (0.5 mol) of dimethyl terephthalate, 55.8 g (0.9 mol) of ethylene glycol and 0.04 g of zinc acetate dihydrate is melted at 170° C, under nitrogen, in a cylindrical stirred vessel. Whilst stirring continuously, the temperature is raised to 240° C in the course of 3 hours, during which time the bulk of the methanol formed distils off. After a further hour at 240° C, 0.05 g of triphenyl phosphite, 0.05 g of antimony trioxide and 0.3 g of 2,6di-tert.-butyl-p-cresol are added and the temperature is raised to 280° C. The pressure is gradually reduced to 14 mm Hg. After a reaction time of 20 minutes, the polycondensation is discontinued by admitting nitrogen into the system. The temperature of the resulting melt is lowered to 260° C and 26.37 g (0.055 mol) of 5-endomethylenetetrahydrophthalimidyl-isophthalic acid diphenyl ester are added. The vacuum is reduced carefully to 0.05 mm Hg and the reaction temperature is lowered to 250° C. After 1.5 hours under these conditions, a highly viscous melt is formed, which on cooling solidifies as crystals; melting point 232° C.

The polyester obtained in this way is moulded for 30 minutes in a sheet press, at 275°–280° C under a light contact pressure, to give a transparent sheet. In contrast to the product which has not been crosslinked, the resulting moulding is now only partially soluble in m-cresol.

The 5-endomethylenetetrahydrophthalimidyl-isophthalic acid diphenyl ester used in the above example is prepared as follows:

90.0 g (0.3 mol) of 5-maleimidyl-isophthalic acid dichloride are dissolved in 900 ml of anhydrous benzene. 30 ml (0.36 mol) of freshly distilled cyclopentadiene are then added, whilst stirring, whereupon the temperature of the reaction mixture rises from 20°–25° C to 42° C. After stirring the reaction mixture for three hours, 600–700 ml of benzene are distilled off from the resulting pale yellowish solution in a rotary evaporator. Part of the reaction product separates out from the concentrated solution as a white precipitate. 300 ml of anhydrous cyclohexane are added and the reaction mixture is left to stand in an ice bath for several hours. The product which has precipitated is filtered off, washed with a little cyclohexane and dried in vacuo at 40° C. 90.6 g (83% of theory) of white, crystalline 5-endomethylenetetrahydrophthalimidyl-isophthalic acid dichloride are obtained; melting point 162°–164° C.

36.42 g (0.1 mol) of the 5-endomethylenetetrahydrophthalimidyl-isophthalic acid dichloride are added to a suspension, which has been cooled to 5° C, of 24.0 g (0.207 mol) of sodium phenolate in 200 ml of ethyl acetate, whilst stirring, and the temperature of the reaction mixture rises to 45° C. The resulting suspension is stirred for 2 hours at 70° C, then cooled to 20°–25° C and filtered. The residue on the filter is suspended in methylene chloride, the suspension is centrifuged and the slightly turbid supernatant liquor is separated off, sodium bisulphate hydrate is added and the mixture is shaken for 20 minutes. The resulting clear solution is percolated through a column of silica gel and evaporated in a rotary evaporator. A little diethyl ether is added to the residue, whereupon 5-endomethylenetetrahydrophthalimidyl-isophthalic acid diphenyl ester crystallises out. In an analogous manner, further crystalline product is isolated from the filtrate obtained from the abovementioned filtration. The two mixtures containing crystalline product are combined and filtered and the residue is dried in vacuo at 100° C. 26.1 g (54.5% of theory) of crystalline 5-endomethylenetetrahydrophthalimidyl-isophthalic acid diphenyl ester, which has a melting point of 184°– 185° C, are obtained.

EXAMPLE 23

Copolymer of

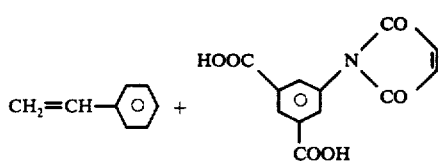

100 g (0.96 mol) of styrene and 100 g (0.383 mol) of 5-maleimidyl-isophthalic acid, together with 0.2 g of α,α'-azo-isobutyronitrile, are suspended in 1,000 ml of N,N-dimethylformamide. The reaction vessel is flushed well with nitrogen, after which the reaction mixture is warmed to 60° C. The mixture is then polymerised for 6 hours at this temperature, whilst stirring. During this time the reaction mixture goes completely into solution. A further 0.2 g of α, α'-azo-isobutyronitrile is added and the polymerisation is continued for 10 hours. The resulting viscous solution is stirred into about 7 litres of water and the polymer which has precipitated is filtered off and dried in vacuo at 70° C. The polymer is then extracted by boiling in benzene for 2 hours, the mixture is filtered and the product is dried in vacuo at 170° C.

Elementary analysis shows that the copolymer obtained after extracting by boiling in benzene consists of about 50 mol % of each of the structural elements of the formulae

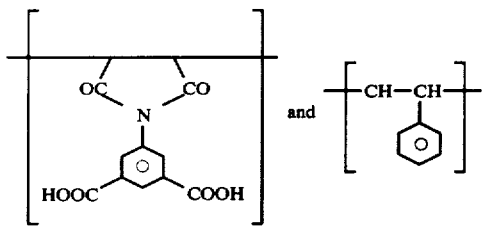

EXAMPLE 24

Copolyamide of:

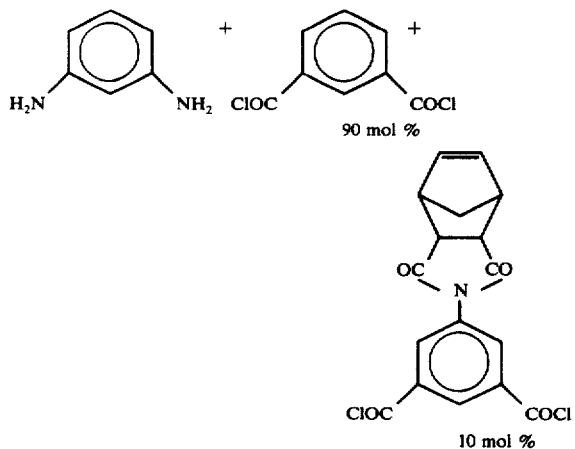

53.69 g (0.496 mol) of m-phenylenediamine are dissolved in 470 ml of DMA and the solution is cooled to −20° C. A liquid mixture of 91.362 g (0.45 mol) of isophthalic acid dichloride and 18.209 g (0.05 mol) of 5-endomethylenetetrahydrophthalimidyl-isophthalic acid dichloride is added, whilst stirring and cooling with a bath of solid carbon dioxide, from a dropping funnel which is thermostatically controlled at +70° C, at such a rate that the temperature of the reaction mixture is between −20° C and −10° C and no m-phenylenediamine crystallises out. Residues of the acid chloride which remain on the wall of the dropping funnel are rinsed down with a little tetramethylurea. The cooling bath is removed and the reaction mixture is stirred for 3 hours at 20°-25° C. A highly viscous solution of the copolyamide is obtained and, for example, this can be neutralised with ammonia or calcium hydroxide, or the copolyamide can be precipitated with water. Inherent viscosity of the colourless polymer = 0.9 dl/g (0.5% by weight in DMA at 25° C). The yield is quantitative. The polymer is soluble in N,N-dimethylformamide and N,N-dimethylacetamide without the addition of a salt. Tough, clear and colourless films, which on heating crosslink from about 250° C, can be produced from the polymer solutions.

EXAMPLE 25

In accordance with the procedure described in Example 24, 53.69 g (0.496 mol) of m-phenylenediamine are polycondensed with 96.44 g (0.475 mol) of isophthalic acid dichloride and 9.10 g (0.025 mol) of 5-endomethylenetetrahydrophthalimidylisophthalic acid dichloride. 122 g of a colourless, fibrous copolyamide which has an inherent viscosity of 1.2 dl/g (0.5% by weight in DMA at 25° C) are obtained. The copolyamide is soluble in N,N-dimethylformamide and N,N-dimethylacetamide without the addition of a salt and is suitable for the production of colourless, tough films. 25 μm thick films produced therefrom remain colourless and flexible even after heating to 300° C for 16 hours. The crosslinked films are insoluble in the customary organic solvents.

We claim:

1. A crosslinkable polymer with an average molecular weight of at least 1000, which is characterized in that it consists of 0.5 to 100 mol % of recurring structural elements of the formula III

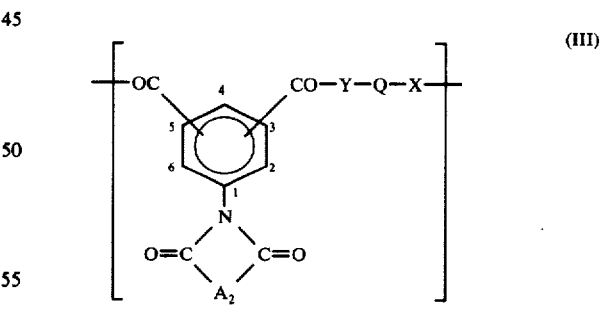

and 0 to 99.5 mol % of recurring structural elements of the formula IV

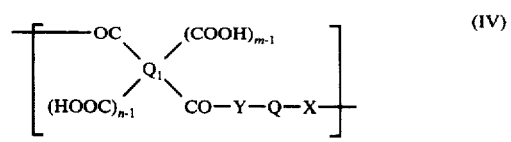

and contain at least three structural elements of the formula III, and the —CO—groups in formula III are bonded to the benzene ring in the 2,3-, 3,4- or 2,3-position, $m$ and $n$ independently of one another represent the number 1 or 2, $A_2$ represents a radical of the formula

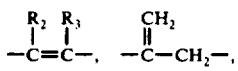

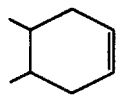 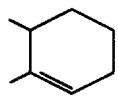  or

$R_2$ and $R_3$ independently of one another represent hydrogen, chlorine or bromine, X and Y independently of one another represent

where $R_4$ is hydrogen, alkyl with 1 to 4 carbon atoms or phenyl, Q represents an aliphatic radical with at least 2 carbon atoms or a cycloaliphatic, araliphatic, carbocyclic-aromatic or heterocyclic-aromatic radical, or —Y—Q—X— represents the grouping

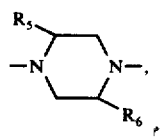

$R_5$ and $R_6$ independently of one another represent hydrogen, methyl or phenyl and $Q_1$ represents an aliphatic radical or represents a cycloaliphatic, carbocyclic-aromatic or heterocyclic-aromatic radical in which the carbonyl and carboxyl groups are bonded to different carbon atoms and the carboxyl groups are each in the ortho-position relative to a carbonyl group, or the corresponding cyclized imide derivative.

2. A crosslinkable polymer according to claim 1 which has structural elements of the formula III wherein $A_2$ represents the group

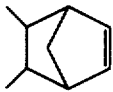

or the group —CH=CH—.

3. A crosslinkable polymer according to claim 1, consisting of 3–50 mol % of structural elements of the formula III, in which the —CO— groups are in the 3,5-position of the benzene ring, and 50–97 mol % of structural elements of the formula IV, wherein $A_2$ denotes the group

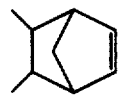

or the group —CH=CH—, X and Y each denote —NH—, Q denotes the 1,3- or 1,4-phenylene group, the 4,4'-diphenylmethane radical or the 4,4'-diphenyl ether radical and, when $m$ and $n = 1$, $Q_1$ denotes the 1,3- or 1,4-phenylene group or an unsubstituted alkylene group with 4–10 carbon atoms and, when $m = 1$ and $n = 2$, $Q_1$ denotes a benzene ring and, when $m$ and $n = 2$, $Q_1$ denotes a benzene ring or the benzophenone ring system, and also the corresponding cyclised derivative.

4. A crosslinkable polymer according to claim 1, consisting of 3–50 mol % of structural elements of the formula III, in which the —CO— groups are in the 3,5-position of the benzene ring, and 50–97 mol % of structural elements of the formula IV, wherein $A_2$ represents the group

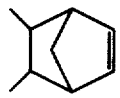

or the group —CH=CH—, X and Y each represent —NH—, $m$ and $n$ each represent the number 1, Q represents the 1,3- or 1,4-phenylene group and $Q_1$ represents the 1,3-phenylene group.

5. A crosslinkable polymer as claimed in claim 1, consisting of from 1 to 10 mole-% of recurring structural units having the formula

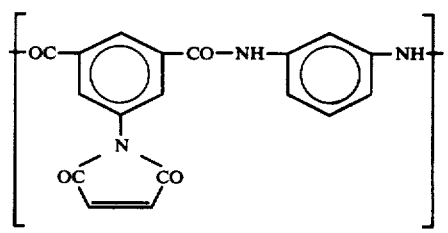

and from 90 to 99 mole-% of recurring structural units having the formula

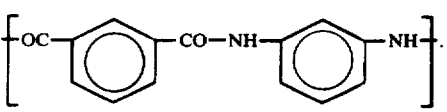

6. A crosslinkable polymer as claimed in claim 1, consisting of about 10 mole-% of recurring structural units having the formula

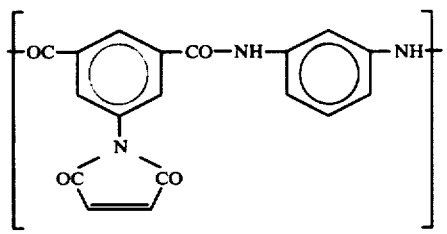

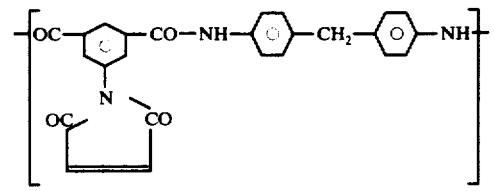

and about 80 mole-% of recurring structural units having the formula

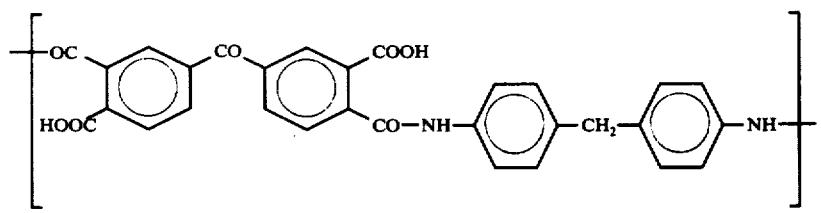

or

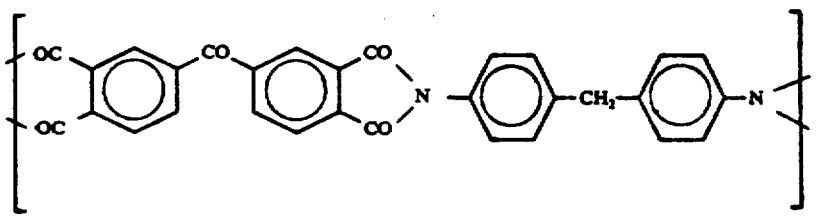

and about 90 mole-% of recurring structural units having the formula

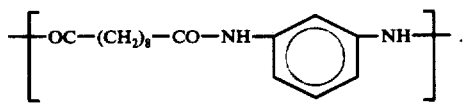

7. A crosslinkable polymer as claimed in claim 1, consisting of about 10 mole-% of recurring structural units having the formula

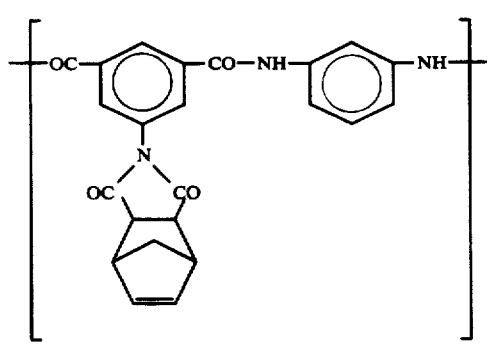

and about 90 mole-% of recurring structural units having the formula

9. A crosslinkable polymer as claimed in claim 1 consisting of 10 mole % of recurring structural units having the formula

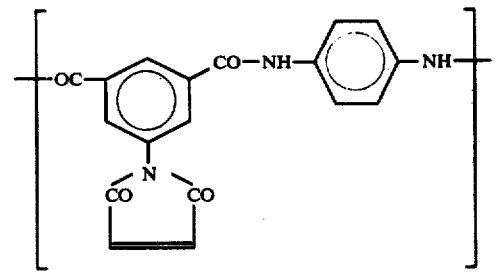

and 90 mole % of recurring structural units having the formula

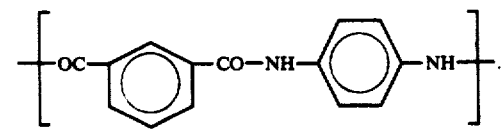

10. A crosslinkable polymer as claimed in claim 1 consisting of 10 mole % of recurring structural units having the formula

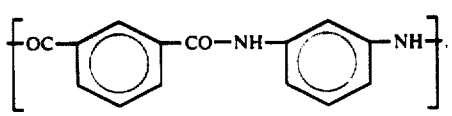

8. A crosslinkable polymer as claimed in claim 1, consisting of about 20 mole-% of recurring structural units having the formula

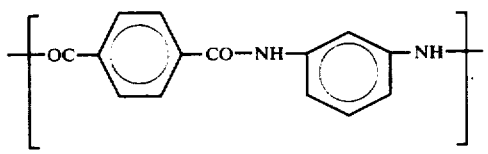

11. A crosslinkable polymer as claimed in claim 1 consisting of 100 mole % of recurring structural units having the formula

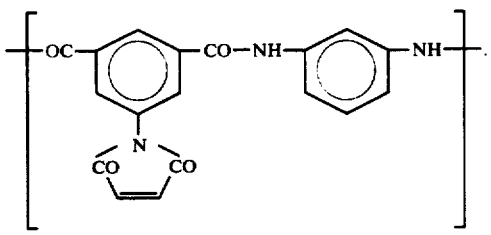

12. A crosslinkable polymer claimed in claim 1 consisting of 10 mole % of recurring structural units having the formula

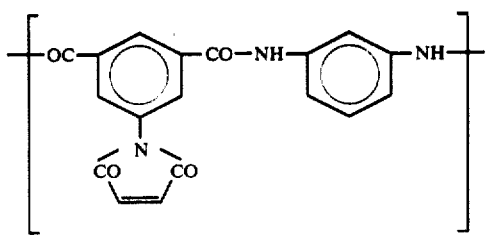

and 90 mole % of recurring structural units having the formula

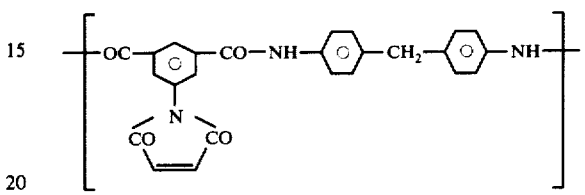

and 90 mole % of recurring structural units having the formula

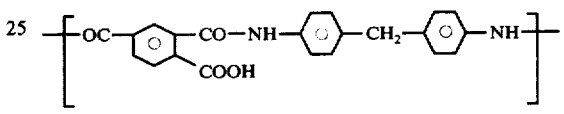

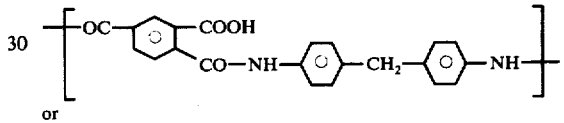

or

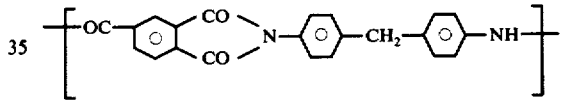

* * * * *